(12) United States Patent
Koh

(10) Patent No.: US 10,376,030 B1
(45) Date of Patent: Aug. 13, 2019

(54) WHEELED TOTE

(71) Applicant: Paul Koh, New York, NY (US)

(72) Inventor: Paul Koh, New York, NY (US)

(73) Assignee: Paul Koh, New York, NY (US)

( * ) Notice: Subject to any disclaimer, the term of this patent is extended or adjusted under 35 U.S.C. 154(b) by 0 days.

(21) Appl. No.: 16/107,254

(22) Filed: Aug. 21, 2018

(51) Int. Cl.
| A45C 5/14 | (2006.01) |
| B62B 3/02 | (2006.01) |
| A45C 7/00 | (2006.01) |
| A45C 13/36 | (2006.01) |
| A45C 13/04 | (2006.01) |
| A45C 13/26 | (2006.01) |

(52) U.S. Cl.
CPC ............ *A45C 5/145* (2013.01); *A45C 7/0036* (2013.01); *A45C 13/04* (2013.01); *A45C 13/262* (2013.01); *A45C 13/36* (2013.01); *B62B 3/02* (2013.01); *B62B 2202/26* (2013.01)

(58) Field of Classification Search
CPC ....... A45C 7/00; A45C 7/0036; A45C 7/0059; A45C 7/0063; A45C 7/0077; A45C 13/04; A45C 13/262
See application file for complete search history.

(56) References Cited

U.S. PATENT DOCUMENTS

| 1,683,029 | A | * | 9/1928 | Fanger | .................. | B62B 5/0083 |
| | | | | | | 190/900 |
| 3,693,994 | A | * | 9/1972 | Wilson | ................. | A45C 13/385 |
| | | | | | | 190/18 A |
| 5,464,237 | A | * | 11/1995 | Saporiti | .................... | B62B 1/20 |
| | | | | | | 188/6 |
| 6,197,225 | B1 | * | 3/2001 | Tanizawa | ............. | C07D 311/92 |
| | | | | | | 252/586 |
| 6,267,393 | B1 | * | 7/2001 | Mengrone | ................ | A45C 5/14 |
| | | | | | | 280/30 |
| 6,955,365 | B2 | * | 10/2005 | Giampavolo | ............. | B62B 1/12 |
| | | | | | | 229/117.09 |
| 7,165,661 | B2 | * | 1/2007 | Miyoshi | ............... | A45C 13/262 |
| | | | | | | 16/113.1 |
| D688,449 | S | * | 8/2013 | Schinasi | ........................ | D3/232 |
| 10,004,651 | B2 | * | 6/2018 | DeLuca | ............... | A61G 1/0243 |
| 2003/0034636 | A1 | * | 2/2003 | Ng | ............................ | A45C 5/14 |
| | | | | | | 280/652 |
| 2012/0013090 | A1 | * | 1/2012 | Musi | ........................ | A45C 3/04 |
| | | | | | | 280/47.34 |
| 2014/0151172 | A1 | * | 6/2014 | Diaz | ........................ | A45C 3/04 |
| | | | | | | 190/1 |
| 2015/0313332 | A1 | * | 11/2015 | Pickens | ................ | A45C 7/0036 |
| | | | | | | 190/18 A |

* cited by examiner

*Primary Examiner* — Brian L Swenson

(57) ABSTRACT

One embodiment of a wheeled tote includes a multifunctional set of resiliently flexible handles that are suitable for responsively guiding the wheeled tote as it rolls, for lifting the wheeled tote, and for comfortably carrying the wheeled tote in a hands-free manner over extended distances. The wheeled tote includes a zip-top collapsible tote bag comprising a sturdy fabric, and a collapsible frame with swivel casters that is removably attached to the bag with fabric snaps. The wheeled tote is reconfigurable between an expanded configuration and a collapsed configuration for better storage and portability. Stays reinforce the left and right sidewalls of the bag. A bottom insert reinforces the base of the bag, and can be used as an actuator to quickly and easily expand the bag from the collapsed configuration to the expanded configuration. Other embodiments are described and shown.

20 Claims, 8 Drawing Sheets

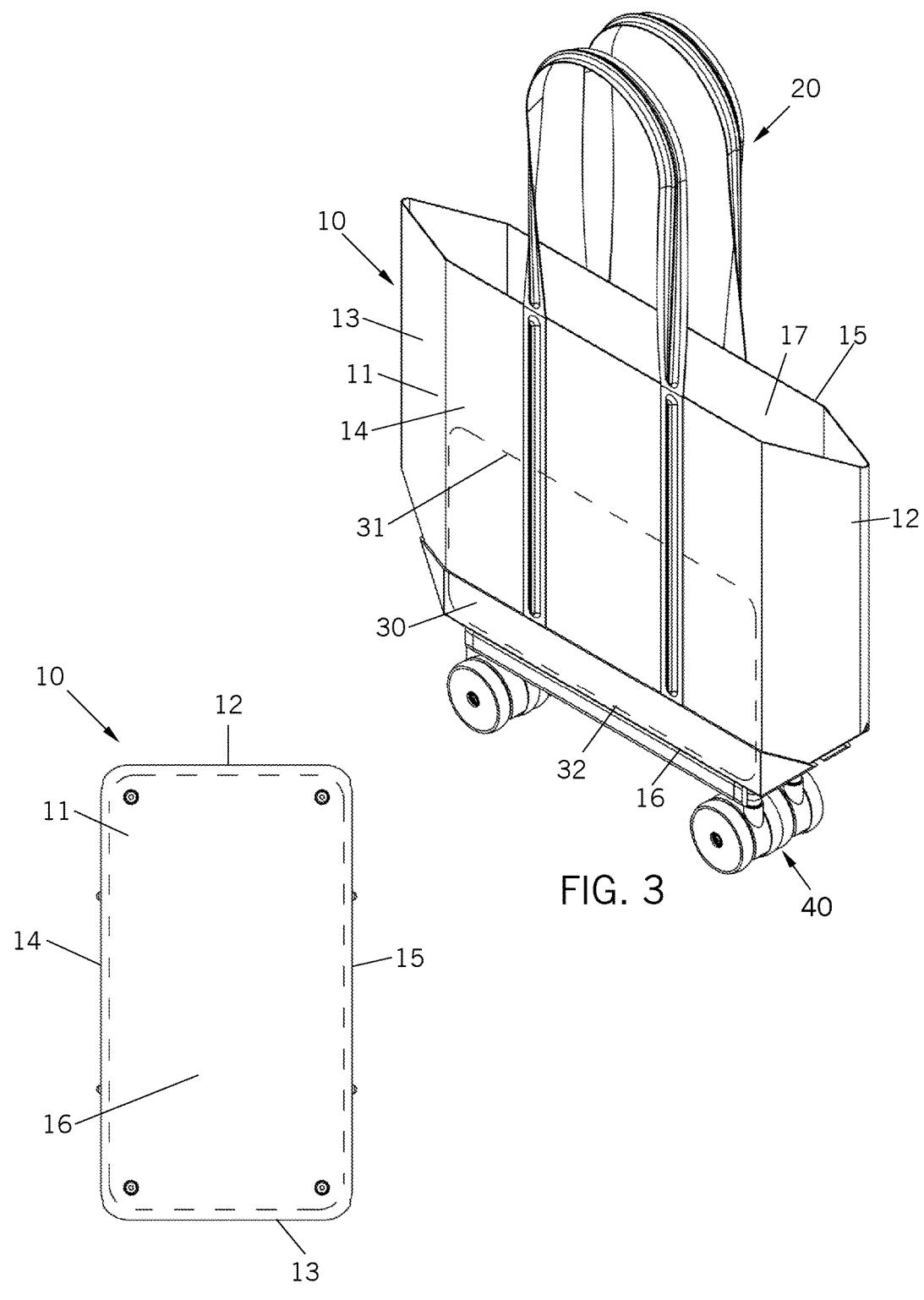

WHEELED TOTE

CROSS-REFERENCE TO RELATED APPLICATIONS

This application claims the benefit of provisional patent application Ser. No. 62/548,390, filed Aug. 21, 2017 by the present inventor.

BACKGROUND

Small wheeled containers with extended rigid handles, commonly known as shopping trolleys, are well known as a more convenient alternative to shopping bags that are carried by hand. In typical use, trolleys are rolled to a store, loaded with goods, and then rolled home. Shopping trolleys facilitate shoppers purchasing larger and heavier items, which are often more economical, without the strain of carrying these items home by hand.

A common type of shopping trolley comprises a top-opening fabric bag, a rigid frame, at least two wheels, and an extended rigid handle. Beyond these basic features, there are many variations, including collapsible frames, retractable handles, and swivel caster wheels.

While current shopping trolleys are useful, they have a number of deficiencies. Most glaringly, current trolleys are primarily designed to be rolled, with little consideration for being lifted or carried for extended periods of time. It would often be desirable for a trolley to be carried over the shoulder in an agile, hands-free, and space efficient manner while shopping or while en route to a store, as opposed to having one's hands tied up rolling around an empty trolley. This is especially true in crowded urban markets and sidewalks, where shopping trolleys are typically used.

Current trolleys must either be carried awkwardly by their extended rigid handles, or for those that have them, carried with a secondary set of tote handles which are typically made of flexible fabric or fabric-encased rope or tubing. The primary rigid handles are typically not at all suitable to be used as a shoulder strap, being rigid and improperly shaped. The secondary tote handles typically have insufficient drop length to be used as a shoulder strap, and when carried as such, the primary handle becomes an awkward protrusion.

The extended rigid handles on current trolleys are typically supported by bulky rigid frames, often comprising metal tubing, that are uncomfortable to carry. They create uncomfortable protrusions against the body, and do not have any compliance that would allow them to more comfortably conform to the body. While some trolleys can collapse to a more compact configuration, the folding process is often cumbersome and time consuming. Those that do not collapse at all are less convenient to store while not in use, and can be cumbersome to carry.

Current trolleys are also awkward to lift, owing to their primary rigid handles typically being fully offset to one side of the trolley, rather than being centered, leading to an awkward swinging of the trolley when lifted. Trolleys with secondary tote handles can be easier to lift, but one must then inconveniently switch between the primary rigid handle for rolling the trolley, and the secondary tote handles for lifting the trolley. When lifting with the secondary tote handles, the primary rigid handle often awkwardly protrudes and pokes at the user, unless it is inconveniently retracted. Constantly switching between the primary and secondary handles is especially inconvenient in urban environments where obstacles requiring lifting the trolley, such as stairs and curbs, are frequently encountered.

An offset primary rigid handle also blocks access to the container from one side, and asymmetrically forces use of the trolley from a specific side. While some trolleys include means to telescopically retract the rigid handle, it is inconvenient to do so repeatedly, and a retractable mechanism adds complexity and cost.

Some trolleys omit the primary rigid handle entirely and have only flexible tote handles, but these tote handles, having no stiffness, provide extremely slack and sloppy maneuvering of the rolling trolley.

Current trolleys can be difficult to maneuver while rolling in crowded environments. Many trolleys cannot roll laterally, limiting their agility and maneuverability. In addition, many trolleys require being toggled between a tilted position in order to roll, and an upright position to rest, further limiting maneuverability.

In addition, the bags on many trolleys are inconvenient or impossible to remove from the frames, making the bags difficult to wash. The bags and frames are also often not easily separable or individually replaceable for purposes such as cleaning, adding modular functionality, improving aesthetics, or facilitating repair.

Finally, the odd, shoddy appearance of many shopping trolleys, attributable to both their peculiar designs and their manner of use, as compared to typical non-rolling shopping bags, have led to them carrying a stigma, making many hesitant to purchase or use them.

SUMMARY

In accordance with one embodiment, a wheeled tote comprises a container formed from a base and sidewalls, a resiliently flexible first handle attached to a left side of the container, a resiliently flexible second handle attached to a right side of the container, the handles deflectable until at least some portion of the handles are mutually adjacent, a frame attached to the container; and at least one rolling element attached to the frame.

Advantages

Accordingly several advantages of one or more aspects are as follows: to provide a wheeled tote that has a single set of resiliently flexible tote handles that are effective for multiple functions, including comfortably carrying the tote over extended distances, responsively maneuvering the rolling tote, and easily lifting the tote, without the need for an unattractive and extraneous extended rigid handle or the accompanying bulky and heavy rigid frame, that can be comfortably carried in a hands-free manner, that eliminates asymmetries of handles offset to one side, that can roll omnidirectionally while in a stable upright position, that can roll by one's side in a position similar to a tote bag that is being carried, that can collapse to a compact configuration for better storage and portability, that can be collapsed and expanded quickly and easily, and that has an easily detachable and attachable bag.

Other advantages of one or more aspects will be apparent from a consideration of the drawings and ensuing description.

BRIEF DESCRIPTION OF THE DRAWINGS

FIG. 2 shows a bottom view of a bag of the wheeled tote of FIG. 1.

FIG. 3 shows a top left perspective view of the wheeled tote of FIG. 1 in a collapsed configuration.

DETAILED DESCRIPTION

Figure 1:
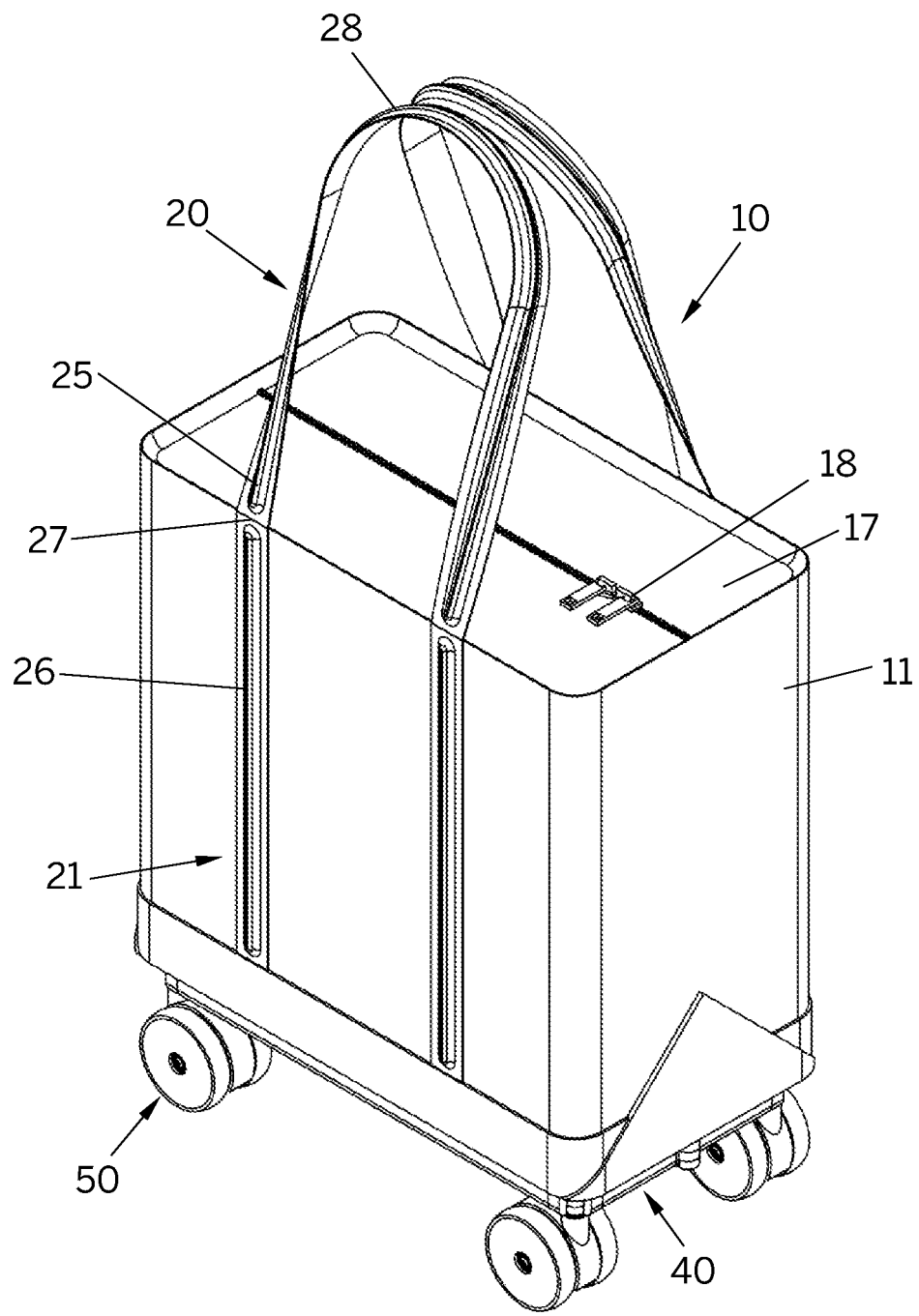
FIG. 1 shows a top left perspective view of a wheeled tote in an expanded configuration in accordance with one embodiment.
Figure 4:
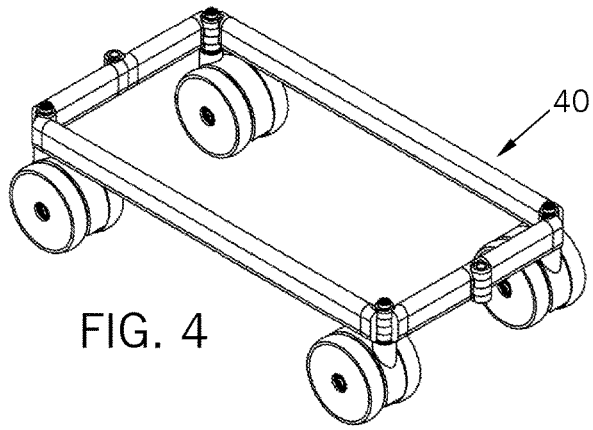
FIG. 4 shows a top left perspective view of a collapsible frame of the wheeled tote of FIG. 1 in an expanded configuration.

One embodiment of wheeled tote 10 is illustrated in FIGS. 1-12. Referring to FIG. 1, wheeled tote 10, briefly described, comprises a zip-top bag 11, resiliently flexible handle 20, a stay 21, collapsible frame 40, and a swivel caster 50.

Referring to FIG. 1, bag 11 has a known tote bag style and construction, having a base and sidewalls. Referring to FIG. 2, bag 11 has a front panel 12, a back panel 13, a left panel 14, a right panel 15, and a bottom panel 16. For reference, a longitudinal direction is defined as normal to front and back panels 12, 13. A lateral direction is defined as normal to left and right panels 14, 15. A vertical direction is defined as normal to bottom panel 16. Referring back to FIG. 1, the interior of bag 11 is preferably enclosed by a top panel 17 with a zipper 18. Alternatively, top 17 could be omitted such that bag 11 has an open top. In addition, zipper 18 could be replaced by any suitable fastener, such as hook and loop fasteners or snaps, and top 17 could open in any suitable manner, such as around the perimeter of top 17 rather than across the middle. Bag 11 comprises a sturdy fabric, such as heavy duty canvas, with sufficient stiffness to make bag 11 sidewalls free-standing. While a sturdy canvas has found to be advantageous, any suitable fabric of any stiffness could be used, such as nylon, polyester, cotton, mesh, etc. As shown in FIG. 3, bag 11 and frame 40 can be folded to the collapsed configuration. While the style and construction of bag 11 have been found to be advantageous, any suitable bag or container could be used. For example, bag 11 could be replaced by a container comprising semirigid or rigid panels that are hingedly attached to provide an expanded and collapsed configuration.

Figure 7:
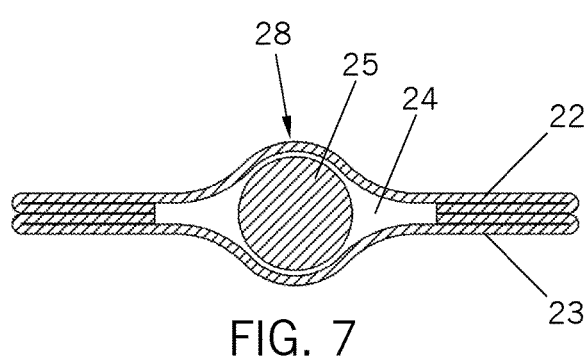
FIG. 7 shows a cross sectional view of a handle of the wheeled tote of FIG. 6, at the indicated location in FIG. 6 by section lines 7-7.
Figure 6:
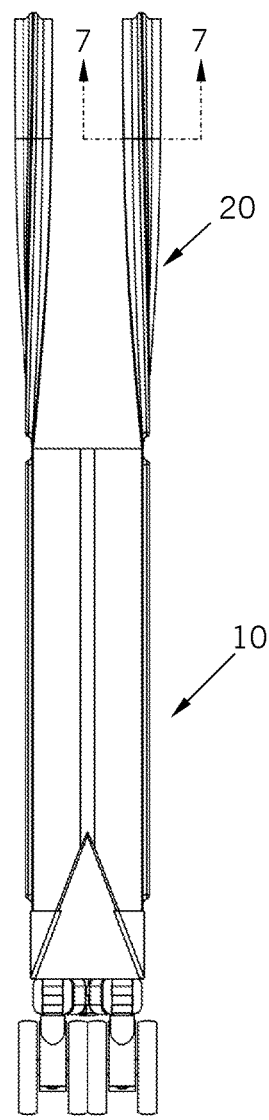
FIG. 6 shows a front view of the wheeled tote of FIG. 3.
Figure 10:
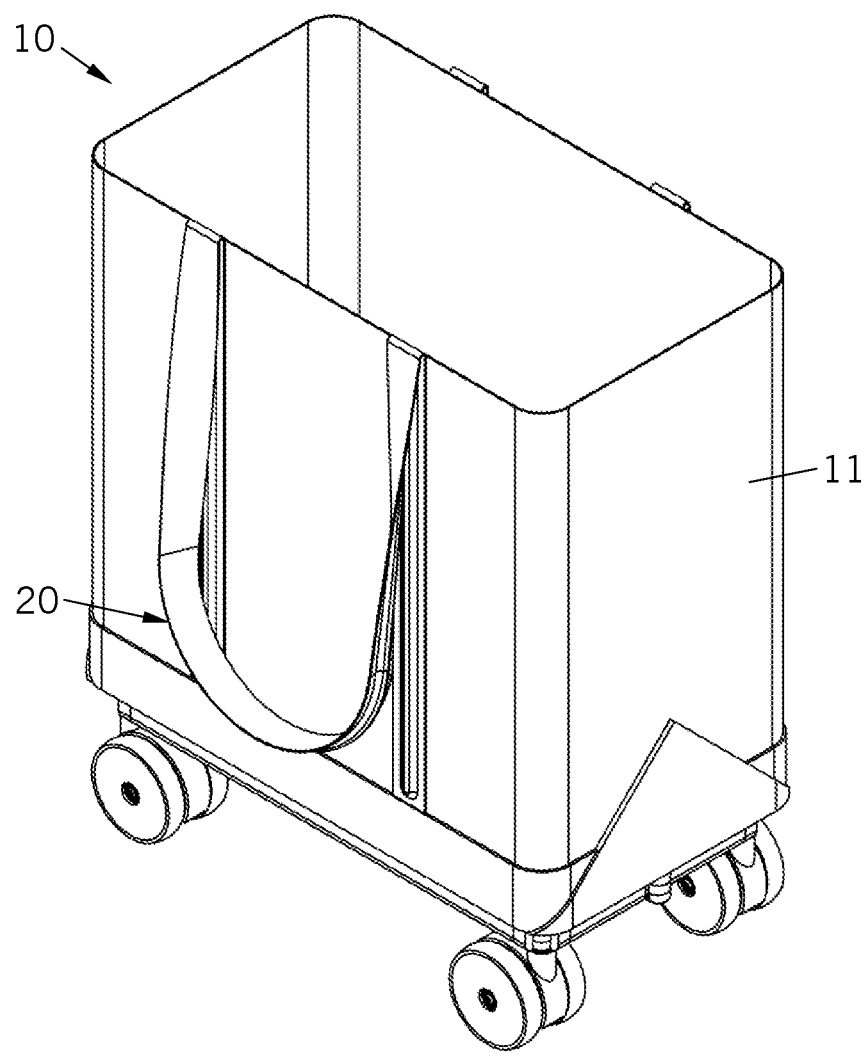
FIG. 10 shows a top left perspective view of the wheeled tote of FIG. 1 in a loading configuration.
Figure 11:
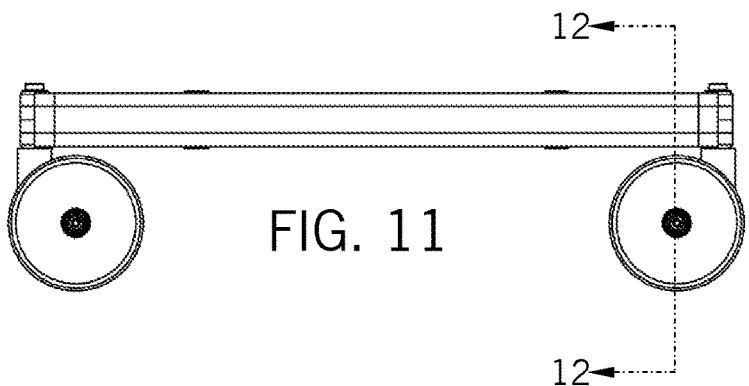
FIG. 11 shows a side view of the collapsible frame of FIG. 1 in a collapsed configuration.

Referring to FIG. 1, two handles 20 and four stays 21 are formed from a long fabric strap 28. Referring to FIG. 7, strap 28 comprises a first fabric layer 22 and a second fabric layer 23, joined along their edges, forming an enclosed channel 24 that runs the length of strap 28. Channel 24 provides a convenient location to place resiliently flexible reinforcements. Referring to FIG. 1, handle 20 includes a handle reinforcement 25 hidden inside channel 24 of each handle 20. Handles 20 have sufficient drop length to be easily grasped, when upright. Handles 20 also have sufficient drop length to allow tote 10 to be carried over the shoulder. Stay 21 includes a side reinforcement 26 hidden inside channel 24 of each stay 21. A hinge 27 is formed by unreinforced portions of strap 28 between handles 20 and stays 21, allowing handles 20 to pivot inward until mutually adjacent, and also pivot downward until adjacent to bag 11 sidewalls as shown in FIG. 10. Referring to FIG. 1, reinforcements 25, 26 comprise resiliently flexible plastic rod. As a tough, lightweight, and inexpensive material, UHMW plastic, as a solid rod with a diameter of approximately 6.00-8.00 mm, has been found to be an advantageous, but any suitable resiliently flexible reinforcing material and configuration could be used, such as HDPE plastic or stainless steel wire. Handles 20 and stays 21 configured as shown have been found to be advantageous, but any suitable size, shape, number, location, and construction could be used. For example, stays 21 could be replaced by sheets of rigid or semirigid material that reinforce sides 14, 15.

Figure 9:
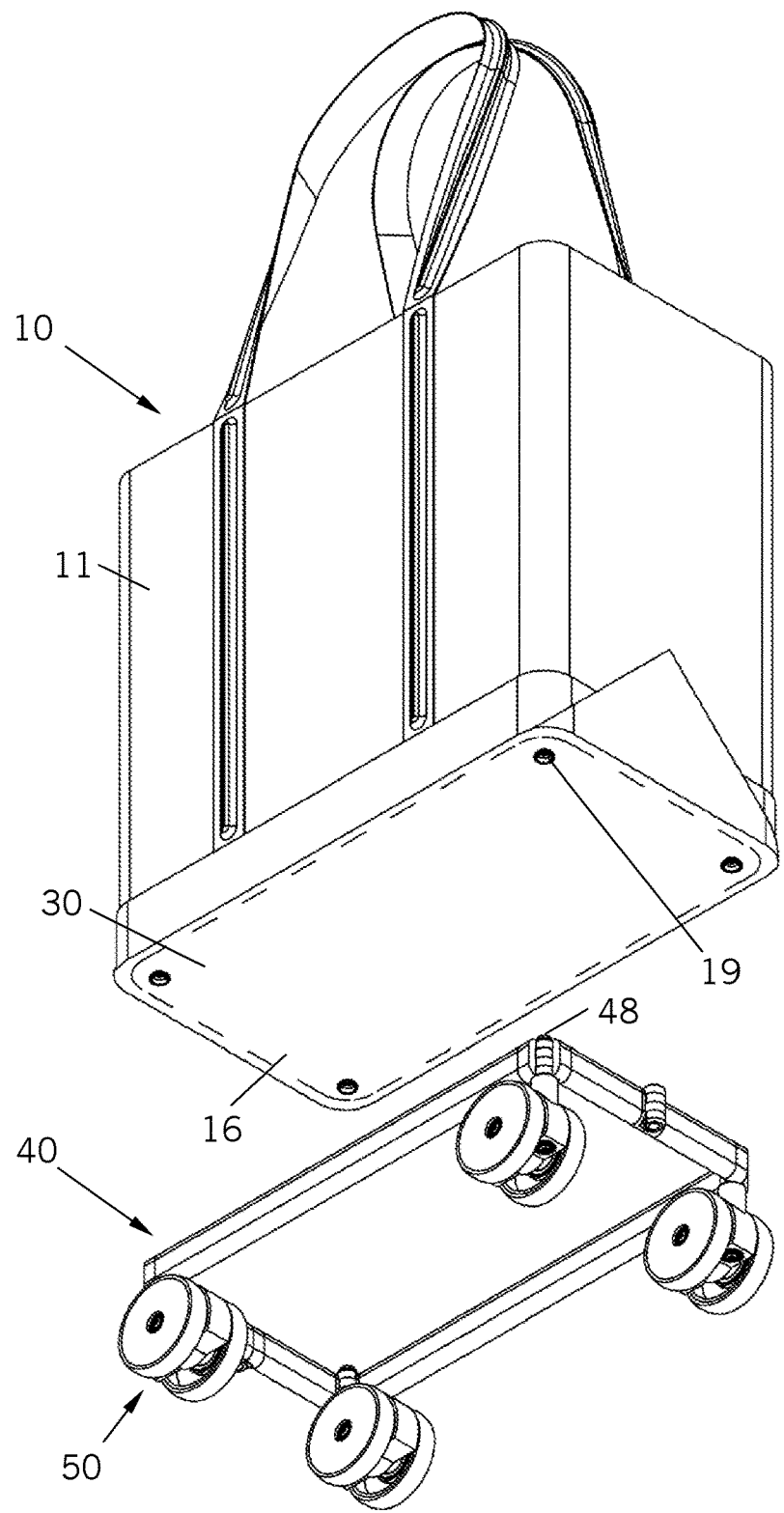
FIG. 9 shows a bottom left perspective exploded view of the wheeled tote of FIG. 1.

Referring to FIG. 9, a bottom insert 30 rests on and substantially spans bottom 16 inside bag 11. Insert 30 comprises a thin sheet of HDPE plastic, but any suitably rigid and preferably thin and lightweight material and configuration could be used, such as PVC foam, corrugated plastic, cardboard, carbon fiber reinforced plastic, glass filled nylon, wood, etc. Alternatively, insert 30 could be omitted. While an economical embodiment of insert 30 is shown, insert 30 could be configured in any other suitable way. For example, insert 30 could be pivotably attached along one if its longitudinal edges to a bottom longitudinal edge of bag 11, to avoid misplacement while still allowing it to flip upward and downward as necessary.

Referring again to FIG. 9, bag U further includes a fabric snap socket 19 near each corner of bottom 16. While fabric snap fasteners are effective and well known, any suitable fastener or fastening method could be used, such as magnets, rivets, screws, hook and loop fasteners, etc.

Figure 8:
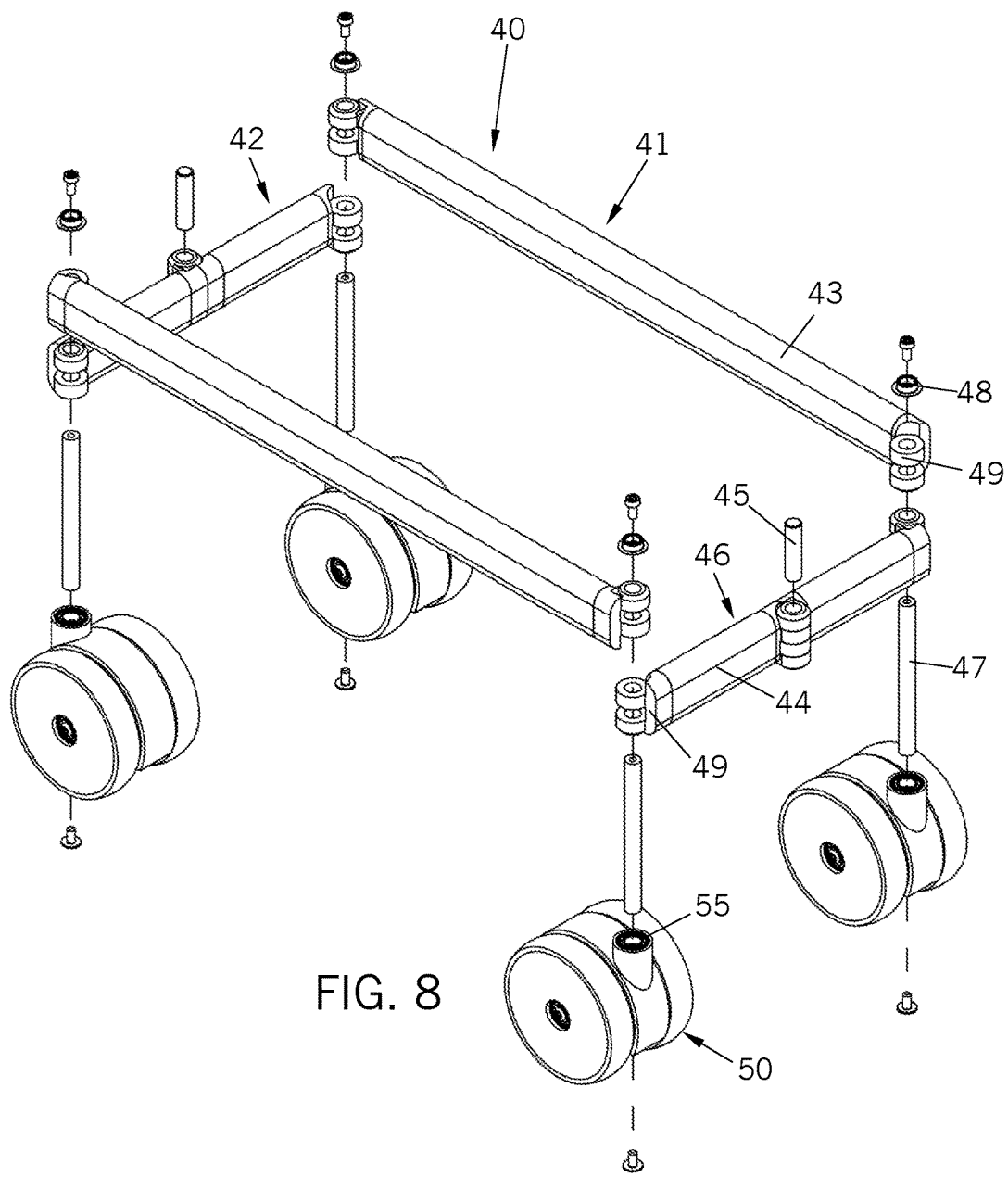
FIG. 8 shows a top left perspective exploded view of the collapsible frame of FIG. 4.

Referring to FIG. 8, frame 40 comprises a long links 41 and a short links 42. Long link 41 comprises a long aluminum extrusion 43 capped on each end with a hinge leaf 49, and short link 42 similarly comprises a short extrusion 44 capped on both ends with leaf 49. Two short links 42 are connected together by a pin 45, forming an arm 46. The distal ends of arms 46 are pivotably connected to the distal ends of long links 41 with a shaft 47. Only the lengths of extrusions 43, 44 need to be adjusted to adapt frame 40 to other bag sizes, making it economical to produce a variety of wheeled tote sizes. While the linkage and construction shown has been found to be advantageous, any suitable construction, and any suitable linkage or collapsible rigid structure could be used. For example, one or more scissor linkages could be employed, and members of an alternative structure could extend upward to the top of bag 11 to be gripped to collapse or expand the device. In addition, links 41, 42 could be injection molded as integral parts that incorporate all necessary features, rather than being assemblies of extrusions and hinge leafs.

Shafts 47 are topped with a snap stud 48. Studs 48 attach to shafts 47 with a screw, but could be attached by any other suitable means, such as rivets, or be integrally formed into the top of shaft 47. Studs 48 are spaced on frame 40 to interface snap sockets 19 on bag bottom 16, shown in FIG. 9. Referring back to FIG. 8, shafts 47 extend below frame 40 for mounting casters 50.

Figure 12:
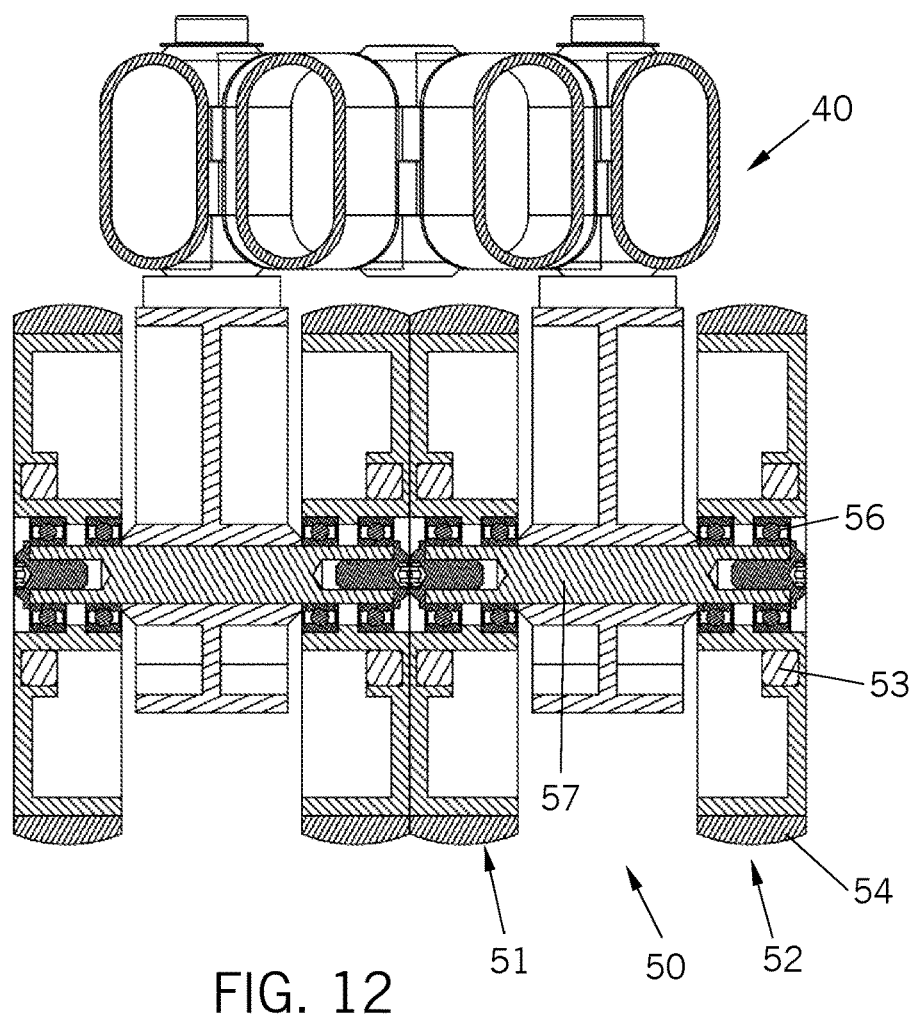
FIG. 12 shows a cross sectional view of the frame of FIG. 11, at the indicated location in FIG. 11 by section lines 12-12.

Referring to FIG. 8, casters 50 mount to shafts 47, and swivel with a ball bearing 55. Casters 50 are retained to shafts 47 by a screw, but could be retained by any other suitable means. Referring to FIG. 12, caster 50 has a first wheel 51, and a second wheel 52, which roll on a ball bearing 56 about an axle 57, and include an elastomeric tread 54 for smoother, quieter rolling. While twin-wheel swivel casters 50 have been found to be advantageous, any other suitable rolling element, in any suitable quantity, in any suitable combination, with any suitable bearing arrangement, and/or in any suitable location, could be used. For example, single wheel swivel casters could be used in combination with rigid non-swiveling casters; omni wheels could be used: the ball bearings of casters 50 could be replaced with a plain bearing arrangement, etc.

Referring to FIG. 12, caster 50 further includes a swivel lock and latch comprising a ring magnet 53 inside wheels 51, 52. The poles of magnets 53 are configured such that adjacent casters 50 attract each other when in close proximity. Care should be taken such that the magnetic fields do not interfere with the rolling of bearings 56, which are typically composed of highly magnetic ferrous steel. Alternatively, bearings 56 composed of non-magnetic materials could be used, increasing the options for magnet type and placement. The magnetic scheme shown has been found to be advantageous, but any other suitable swivel locks and/or latches, magnetic or non-magnetic, could be used, or the swivel lock and/or latch could be omitted. For example, magnets could be placed at the ends of axles 57, and bearings 56 could be replaced by non-magnetic ball bearings; magnets 53 could be replaced by hook and loop fasteners on wheels 51, 52 that temporarily hold them together, etc.

Operation

The manner of loading and unloading wheeled tote 10 is similar to that for a normal non-wheeled tote bag. Referring to FIG. 10, wheeled tote 10 is most conveniently loaded and unloaded when handles 20 are folded at hinge 27 outward and downward, so that handles 20 do not impede access to the interior of bag 11. Bag 11 sidewalls are free-standing, conveniently holding the mouth of bag 11 open for loading and unloading. Referring to FIG. 1, after loading, zipper 18 can be closed to more securely and discreetly convey the contents of bag 11.

Referring to FIG. 1, tote 10 can be rolled in a space efficient upright position, and can be rolled at one's side, in a similar position to where non-wheeled tote bags are located when carried by one's side. Handles 20 are flipped upward and grasped together single-handedly, either at their apexes or somewhere down their lengths, to guide tote 10 as it rolls. Handles 20 and stays 21, while not fully rigid in one embodiment, provide sufficient stiffness to make tote 10 reasonably responsive to maneuver as it rolls. Handles 20, being symmetric left to right, allow tote 10 to be used conveniently from either the left or right side of tote 10. Handles 20 are also suitable for lifting tote 10 over obstacles such as curbs or stairs.

Figure 5:
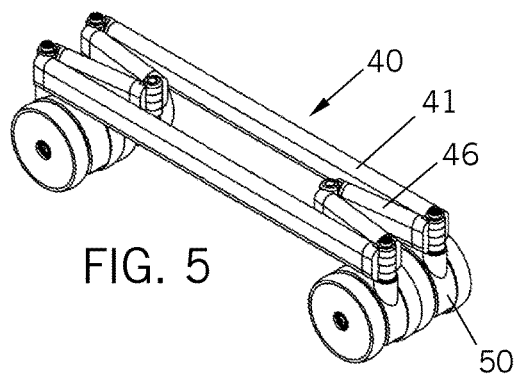
FIG. 5 shows a top left perspective view of the collapsible frame of FIG. 4 in a collapsed configuration.

Tote 10 can be compressed to a collapsed configuration, as shown in FIG. 3, for better storage and portability for a user, as well more efficient shipment, storage, and display for a reseller. Handles 20 can be folded downward, as shown in FIG. 10, to further reduce the size of the collapsed configuration. Referring to FIG. 3, to collapse tote 10, insert 30 is grasped and flipped upward to be parallel and adjacent to left side 14 or right side 15. Bag 11 is then flattened in a manner known in the art, where front 12 and back 13 collapse outward, bottom 16 and top 17 collapse inward, and left and right sides 14, 15 move inward laterally until bag 10 is flattened. Referring to FIG. 9, the collapsing of bottom 16 also urges the collapsing of frame 40, as they are coupled by snap sockets 19 and snap studs 48. Referring to FIG. 5, arms 46 fold inward to collapse frame 40, drawing inward long links 41 and casters 50. Referring to FIG. 12, once in sufficient proximity, magnets 53 hold casters 50 together to serve as a swivel lock to prevent them from flapping around distractingly while tote 10 is being carried with casters 50 off the ground, and also to serve as a latch to hold frame 40 in the collapsed configuration. The swivel lock further creates a tidy storage configuration for tote 10.

In the collapsed configuration of FIG. 3, wheeled tote 10 is not only more convenient to store, but also easier to carry due to its reduced width. In the collapsed configuration, tote 10 can be lifted by handles 20, and carried in various ways, including by hand, in the crook of the arm, and over the shoulder. Carrying over the shoulder is especially convenient, as both hands are left free.

Referring to FIG. 3, to expand tote 10 from the collapsed configuration to the expanded configuration, a convenient method is to pivot insert 30 about a bottom edge 32 of insert 30 (when oriented as shown in FIG. 3) such that a top edge 31 of insert 30 pushes against an opposing panel, left side 14 or right side 15, urging the spacing of left and right sides 14, 15, and concurrently expanding panels 12, 13, 16, and 17, until insert 30 lays flat on bottom 16 as shown in FIG. 9. Referring to FIG. 9, frame 40 is coupled to the corners of bottom 16, so the expanding of bottom 16 also urges the expanding of frame 40. Thus, the simple motion of flipping down insert 30 quickly and easily expands wheeled tote 10. Alternatively, bag 11 and frame 40 can be manipulated directly to expand or collapse tote 10.

Referring again to FIG. 9, to detach bag 11 from frame 40, frame 40 is simply pulled away from bag 11, disengaging snap sockets 19 from snap studs 48. To attach bag 11 to frame 40, snap sockets 19 are aligned to corresponding snap studs 48, and pushed together until engaged. Detached, bag 11 can be more easily washed, and can additionally serve as a conventional non-wheeled tote bag. Frame 40 with casters 50 can also additionally serve as a dolly for moving bulky items such as boxes and the like. Frame 40 and bag 11 can also be easily replaced for cosmetic or functional purposes. For example, frame 40 could be easily replaced if an element failed, and bag 11 could be easily switched out for a bag with a different color.

Additional Embodiments

Figure 13:
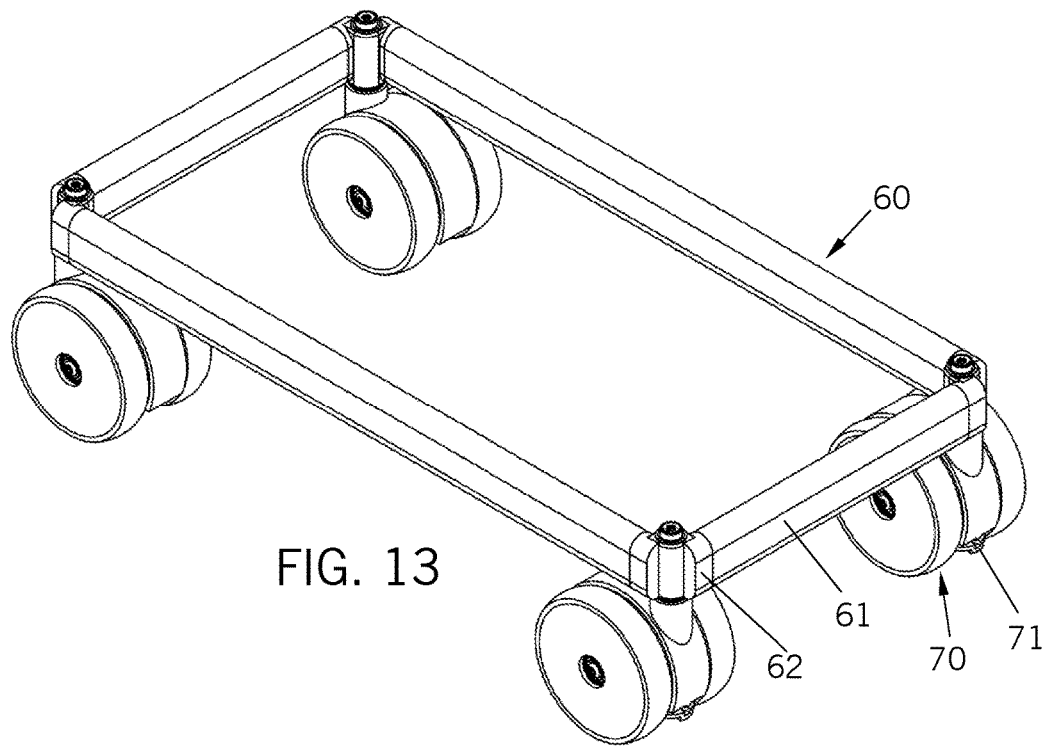
FIG. 13 shows a top left perspective view of an alternative non-collapsible fixed frame, where the alternative frame is fixed in an expanded configuration, and includes an alternative swivel lock mechanism.
Figures 14, 15:
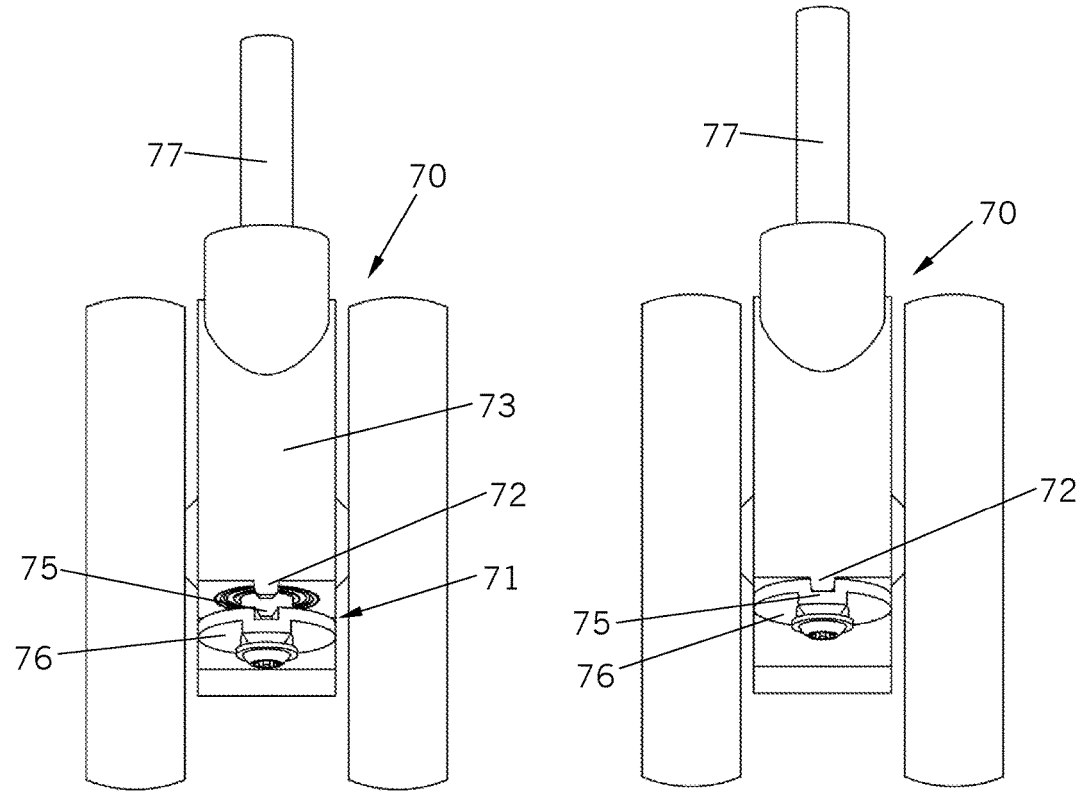
FIG. 14 shows the alternative swivel lock mechanism of FIG. 13 in a disengaged state.
FIG. 15 shows the alternate swivel lock mechanism of FIG. 13 in an engaged state.

Additional embodiments are contemplated in FIGS. 13-15. Referring to FIG. 13, frame 40 could be replaced by non-collapsible fixed frame 60 to reduce manufacturing costs. In fixed frame 60, arms 46 and hinge leaves 49 are replaced with a fixed link 61 and a fixed elbow 62. While one embodiment of a fixed frame is shown, any suitable construction could be used. For example, frame 60 could comprise a single injection molded part, and rather than being an open frame, could be a solid platform.

Referring again to FIG. 13, alternative swivel lock 71 is added to an alternative caster 70 on fixed frame 60. In a non-collapsible frame, casters 70 never make contact with each other, as they do in frame 40 when in a collapsed configuration, so an alternate swivel lock is contemplated.

Referring now to FIG. 14, swivel lock 71 comprises a tooth 72 on a caster chassis 73 that can engage a corresponding recess 75 on a lock disc 76. Chassis 73 can freely slide up and down an alternate shaft 77, which corresponds to shaft 47 in frame 40 (FIG. 8). Shaft 77 is fixed both translationally and rotationally relative to elbow 62 (shown in FIG. 13). Lock disc 76 is also keyed such that it is fixed relative to elbow 62 (shown in FIG. 13), and thus fixed relative to frame 60. When casters 70 are rolling along the ground, the reaction force from the ground pushes casters 70 up shaft 77, disengaging tooth 72 from recess 75, as shown in FIG. 14, leaving caster 70 free to swivel. Referring to FIG. 15, when frame 60 (FIG. 13) is lifted such that casters 70 are off the ground, gravity urges casters 70 to slide down shaft 77, such that tooth 72 contacts lock disc 76. When caster 70 is rotated to the appropriate angle, tooth 72 drops into recess 75, locking the swiveling of caster 70 and aligning it to a known angle relative to frame 60 (FIG. 13). Locking at a known angle allows casters 70 to have a tidy appearance when locked. Alternatively, a locking disc with multiple recesses could be used so that the casters could be locked at multiple angles, which could be more convenient if a specific angle is not required, as it could limit the amount caster 70 would need to swivel before locking. While a specific toothed locking feature has been shown, any suitable gravity-actuated swivel locking means could be used, including magnets, spring plungers, and the like. While an alternative swivel lock is contemplated for fixed frame 60, a similar lock could also be added to frame 40, in addition to magnets 53, to swivel lock casters 50 when tote 10 is in an expanded configuration.

CONCLUSIONS, RAMIFICATIONS, AND SCOPE

Thus the reader will see that at least one embodiment provides a wheeled tote that can utilize a well-known attractive bag style and construction, that can eliminate unattractive and extraneous extended rigid handles and the rigid frames required to support them, that can use a single set of resiliently flexible tote handles to comfortably carry over extended distances, responsively maneuver while rolling, and easily lift the wheeled tote, and can conveniently be used from both the left and right sides of the tote. Additionally, at least one embodiment provides a wheeled tote that can roll omnidirectionally while in a stable upright position, and that can roll by one's side in a position similar to a bag that is being carried by hand. Furthermore, at least one embodiment provides a wheeled tote that can be converted quickly and easily between a collapsed configuration and an expanded configuration, and that can be carried comfortably and conveniently in a hands-free manner. Finally, at least one embodiment provides a wheeled tote that enables easy detachment and attachment between the bag and the frame.

While the above description contains many specificities, these should not be construed as limitations on the scope of any embodiment, but as exemplifications of various embodiments thereof. Many other ramifications and variations are possible within the teachings of the various embodiments. For example, various aspects of the wheeled tote can be scaled and be made adjustable to suit different target demographics; the bag can include various additional features known in the art, including but not limited to pockets, internal dividers, insulation, padding, feet, expandable portions, straps, handles, handle couplers, and the like; and the frame can be located inside the bag rather than outside.

Thus the scope should be determined by the appended claims and their legal equivalents, and not by the examples given.

What is claimed is:

1. A wheeled tote comprising:
   a container formed from a base and sidewalls, the container having a bottom panel with a normal defining a vertical direction, a left and right panels with normals defining a lateral direction, and a front and back panels with normals defining a longitudinal direction;
   a frame attached to the container;
   at least one rolling element attached to the frame;
   a first handle attached to the left panel of the container;
   a second handle attached to the right panel of the container;
   the handles deflectable laterally until at least a portion of the handles are mutually adjacent; and
   the handles having sufficient rigidity wherein urging the handles urges rolling of the wheeled tote.

2. The wheeled tote of claim 1, wherein the handles are flexibly resilient.

3. The wheeled tote of claim 1, wherein at least one handle is pivotably attached to the container.

4. The wheeled tote of claim 1, wherein at least one rolling element is a swivel caster, wherein the swivel caster further includes a swivel lock.

5. The wheeled tote of claim 4, wherein the frame further includes a shaft having an axial direction and a central axis about which the swivel caster swivels, wherein the swivel caster is attached slidably to the shaft in the axial direction, wherein the swivel caster is reconfigurable between a first position up the shaft when the wheeled tote is rolling and a second position down the shaft when the wheeled tote is lifted off the ground and the weight of the swivel caster urges it to slide down the shaft, and wherein the swivel lock is disengaged in the first swivel caster position and engaged in the second swivel caster position.

6. The wheeled tote of claim 1, further comprising a removable fastener attaching the frame and the container, wherein urging the frame in a predetermined direction disengages the removable fastener.

7. The wheeled tote of claim 1, further comprising a fabric strap comprising a handle portion and a stay portion, wherein a handle reinforcement reinforces the handle portion, forming the handle, and/or a side reinforcement reinforces the stay portion, forming a stay.

8. A wheeled tote comprising:
   a container formed from a base and sidewalls, the container having a bottom panel with a normal defining a vertical direction, a left and right panels with normals defining a lateral direction, and a front and back panels with normals defining a longitudinal direction;
   a frame attached to the container;
   at least one rolling element attached to the frame;
   a first handle attached to the left panel of the container;
   a second handle attached to the right panel of the container;
   the handles deflectable laterally until at least a portion of the handles are mutually adjacent;
   the handles having sufficient rigidity wherein urging the handles urges rolling of the wheeled tote;
   wherein the container and the frame further include collapsible portions reconfigurable between a collapsed position and an expanded position,
   the wheeled tote being reconfigurable between:
   an expanded configuration wherein the container and the frame are expanded and the left and right panels of the container and the left and right sides of the frame are in a first spaced relationship; and a collapsed configuration wherein the container and the frame are collapsed and the left and right panels of the container and the left and right sides of the frame are in a second spaced relationship that is closer than the first spaced relationship.

9. The wheeled tote of claim 8, wherein the handles are flexibly resilient.

10. The wheeled tote of claim 8, wherein at least one handle is pivotably attached to the container.

11. The wheeled tote of claim 8, further including a bottom insert supporting the bottom panel of the container, wherein the insert is reconfigurable between an expanded position and a collapsed position, wherein in the collapsed position the insert does not impede collapsing of the frame, and wherein in the expanded position the insert is disposed on an interior of the collapsible container adjacent the base and spanning the base whereby the insert, when moved into the expanded position from the collapsed position, urges the container to expand the expanded configuration.

12. The wheeled tote of claim 11, wherein the insert is pivotably attached to an interior bottom edge of the left or right side of the container.

13. The wheeled tote of claim 8, wherein at least one rolling element is a swivel caster, wherein the swivel caster further includes a swivel lock.

14. The wheeled tote of claim 13, wherein the frame further includes a shaft having an axial direction and a central axis about which the swivel caster swivels, wherein the swivel caster is attached slidably to the shaft in the axial direction, wherein the swivel caster is reconfigurable between a first position up the shaft when the wheeled tote is rolling and a second position down the shaft when the wheeled tote is lifted off the ground and the weight of the swivel caster urges it to slide down the shaft, and wherein the swivel lock is disengaged in the first swivel caster position and engaged in the second swivel caster position.

15. The wheeled tote of claim 8, wherein the frame comprises a collapsible linkage.

16. The wheeled tote of claim 15, wherein the linkage comprises a first bar and a second bar interconnected by a first folding arm and a second folding arm.

17. The wheeled tote of claim 8, further comprising at least one self-engaging latch for securing the wheeled tote in the expanded configuration and/or the collapsed configuration.

18. The wheeled tote of claim 17, wherein at least one rolling element is a swivel caster, wherein the swivel caster further includes a swivel lock, wherein the swivel lock comprises at least one swivel lock magnetic element, wherein the latch comprises a first swivel lock magnetic element and a second swivel lock magnetic element, the first swivel lock magnetic element and the second swivel lock magnetic element configured to self-engage when in close proximity.

19. The wheeled tote of claim 8, further comprising a removable fastener attaching the frame and the container, wherein urging the frame in a predetermined direction disengages the removable fastener.

20. The wheeled tote of claim 8, further comprising a fabric strap comprising a handle portion and a stay portion, wherein a handle reinforcement reinforces the handle portion, forming the handle, and/or a side reinforcement reinforces the stay portion, forming a stay.

* * * * *

UNITED STATES PATENT AND TRADEMARK OFFICE
CERTIFICATE OF CORRECTION

PATENT NO. : 10,376,030 B1  
APPLICATION NO. : 16/107254  
DATED : August 13, 2019  
INVENTOR(S) : Paul Koh Page 1 of 1

It is certified that error appears in the above-identified patent and that said Letters Patent is hereby corrected as shown below:

On the Title Page

Item [63] insert the following:  
--Related U.S. Application Data  
[63] Continuation of application No. 62/548,390, filed on August 21, 2017.--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*